(12) United States Patent
Shokar

(10) Patent No.: US 10,513,809 B2
(45) Date of Patent: *Dec. 24, 2019

(54) REINFORCED NONWOVEN MATERIAL AND METHOD OF USE FOR LANDSCAPING

(71) Applicant: Novum Microfiber Corp., Vancouver (CA)

(72) Inventor: Bobby Shokar, Vancouver (CA)

(73) Assignee: Novum Microfiber Corp., Vancouver, BC (*) Notice: Subject to any disclaimer, the term of this patent is extended or adjusted under 35 U.S.C. 154(b) by 0 days.

This patent is subject to a terminal disclaimer.

(21) Appl. No.: 15/722,557

(22) Filed: Oct. 2, 2017

(65) Prior Publication Data

US 2018/0363180 A1    Dec. 20, 2018

Related U.S. Application Data

(60) Provisional application No. 62/519,197, filed on Jun. 14, 2017.

(51) Int. Cl.
*D04H 1/4374* (2012.01)
*B32B 5/02* (2006.01)
(Continued)

(52) U.S. Cl.
CPC ....... *D04H 1/4374* (2013.01); *A01G 13/0268* (2013.01); *A01G 13/0293* (2013.01);
(Continued)

(58) Field of Classification Search
CPC ...... D04H 1/4374; B32B 5/022; B32B 27/32; B32B 27/18; B32B 2307/72; B32B 2307/54; B32B 2305/38; B29C 59/04; B29C 2035/0838; A01G 13/0293; A01G 13/0268; D10B 2321/022; D10B 2321/021; A01C 1/044; A01C 1/046
(Continued)

(56) References Cited

U.S. PATENT DOCUMENTS 3,257,754 A * 6/1966 Ohsol .................. A01C 1/044
                                                 47/56
4,309,844 A * 1/1982 King ................... A01C 1/044
                                                 47/56
(Continued)

*Primary Examiner* — Philip C Tucker
*Assistant Examiner* — Vicki Wu
(74) *Attorney, Agent, or Firm* — Kevin Keener; Keener & Associates P.C.

(57) ABSTRACT

A novel nonwoven material for use as underlayment in landscaping is disclosed. The inventive method comprises creating a layered nonwoven material, identifying a landscaping location for receiving a portion of said layered nonwoven material; preparing a landscaping location; placing a portion of said layered nonwoven material on said landscaping location. The method may further comprise measuring a portion of said landscaping location; measuring a portion of said layered nonwoven material; comprise cutting one or more desired shapes from a portion of said layered nonwoven material; and securing a portion of said layered nonwoven material to said landscaping location by pushing one or more landscaping pins through said layered nonwoven material and into a portion of ground underneath said layered nonwoven material.

19 Claims, 2 Drawing Sheets

(51) Int. Cl.
  *B32B 27/32*  (2006.01)
  *B32B 27/18*  (2006.01)
  *B29C 59/04*  (2006.01)
  *A01G 13/02*  (2006.01)
  *A47C 31/10*  (2006.01)
  *A47C 31/04*  (2006.01)

(52) U.S. Cl.
  CPC .............. *A47C 31/04* (2013.01); *A47C 31/10* (2013.01); *B29C 59/04* (2013.01); *B32B 5/022* (2013.01); *B32B 27/18* (2013.01); *B32B 27/32* (2013.01); *B32B 2305/38* (2013.01); *B32B 2307/54* (2013.01); *B32B 2307/72* (2013.01); *D10B 2321/021* (2013.01); *D10B 2321/022* (2013.01); *D10B 2505/08* (2013.01)

(58) Field of Classification Search
  USPC ........................................................ 156/242
  See application file for complete search history.

(56) References Cited

U.S. PATENT DOCUMENTS

| | | | |
|---|---|---|---|
| 4,364,197 A * | 12/1982 | Baron | A01G 20/20 47/56 |
| 5,226,255 A * | 7/1993 | Robertson | A01C 1/044 47/56 |
| 5,350,783 A * | 9/1994 | Reich | A61L 15/62 523/124 |
| 5,401,118 A * | 3/1995 | Kramer | E02D 31/004 405/129.45 |
| 6,740,609 B1 | 5/2004 | Peng et al. | |
| 6,929,425 B1 * | 8/2005 | Kimberlin | C09K 17/52 405/302.4 |
| 2002/0031964 A1 * | 3/2002 | Reisdorf | B32B 27/12 442/64 |
| 2005/0178056 A1 * | 8/2005 | Morrone | A01G 13/0268 47/9 |
| 2007/0015426 A1 * | 1/2007 | Ahmed | D02G 3/404 442/361 |
| 2007/0072502 A1 * | 3/2007 | Underwood | D03D 1/00 442/82 |
| 2008/0072488 A1 * | 3/2008 | Fujita | A01C 1/044 47/56 |
| 2008/0085382 A1 * | 4/2008 | Erickson | B44C 1/24 428/15 |
| 2009/0155614 A1 * | 6/2009 | McLeod | B32B 27/32 428/516 |
| 2011/0262682 A1 * | 10/2011 | Wynn | B01D 39/083 428/91 |
| 2013/0203878 A1 * | 8/2013 | Igualada | C08J 9/122 521/85 |
| 2013/0309012 A1 * | 11/2013 | Lancaster | E02B 3/04 405/21 |
| 2015/0225527 A1 * | 8/2015 | Gossi | C08J 9/103 521/95 |

* cited by examiner

REINFORCED NONWOVEN MATERIAL AND METHOD OF USE FOR LANDSCAPING

PRIORITY

This application claims priority to U.S. Provisional Patent Application Ser. No. 62/519,197 filed Jun. 14, 2017, the disclosure of which is hereby fully incorporated by reference.

FIELD OF THE INVENTION

The invention pertains generally to nonwoven materials and more specifically to a specially designed nonwoven material for use in landscaping and its method of use.

BACKGROUND OF INVENTION

Nonwoven materials are known in the industry. Nonwoven materials are formed of mat of intermingled fibers such that the fibers are not in any specific designed configuration or weave. The formation of generic sheets of nonwoven materials, and their use in industry, is known. However, what is needed is a specific design of nonwoven material specifically utilized in landscaping applications.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention is directed toward a method of use of a novel nonwoven material for use as underlayment in landscaping. The inventive method comprises creating a layered nonwoven material, identifying a landscaping location for receiving a portion of said layered nonwoven material; preparing a landscaping location; placing a portion of said layered nonwoven material on said landscaping location.

The method may further comprise measuring a portion of said landscaping location; and measuring a portion of said layered nonwoven material. The method may further comprise cutting one or more desired shapes from a portion of said layered nonwoven material. The method may further comprise securing a portion of said layered nonwoven material to said landscaping location by pushing one or more landscaping pins through said layered nonwoven material and into a portion of ground underneath said layered nonwoven material.

The method may further comprise placing a portion of soil, a portion of sod, or one or more rocks on top of said layered nonwoven material. In one embodiment of the invention, the step of preparing a landscape location is selected from a group consisting of: scraping a section of topsoil, digging a hole in a portion of ground, removing a portion of soil from a landscaping location, and raking a portion of soil or infill. The method may further comprise placing on or more seeds into a portion of soil disposed on top of said layered nonwoven material; and watering a portion of soil disposed on top of said layered nonwoven material.

Creating the layered nonwoven material comprises creating a material mixture (by adding in substantially eighty-five percent by weight of polypropylene; adding in substantially ten percent by weight of polyethylene; adding in substantially three percent by weight of ethylene methyl acrylate; and adding in substantially two percent by weight of a UV stabilizer); heating said material mixture; extruding said material mixture; creating a first layer of nonwoven material formed from said material mixture; placing a layer of woven mesh on top of said first layer; depositing a second layer of nonwoven material formed from said material mixture on top of said layer of woven mesh such that said layer of woven mesh is disposed between said first layer of nonwoven material and said second layer of nonwoven material; and calendaring said layered nonwoven material.

The method may further comprise placing an embossing pattern on a top surface of said layered nonwoven material with an embossing roll. The method may further comprise heating a portion of said layered nonwoven material; and stretching a portion of said layered nonwoven material over a mold. The method may further comprise testing a plurality of physical properties of a portion of said layered nonwoven material; and verifying that each of said plurality of physical properties are within a variance of ten percent of a set of preferred values Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION OF THE PREFERRED EMBODIMENT

Figure 1:
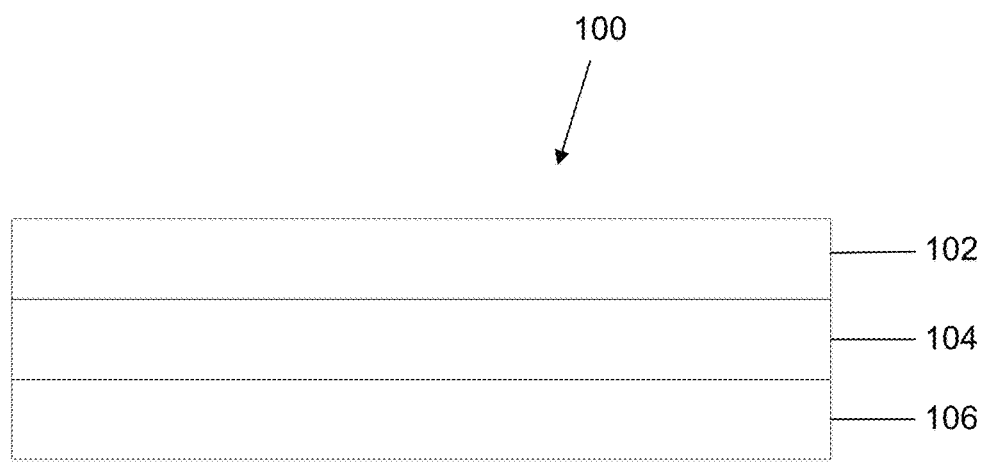
FIG. 1 is a side cutaway view of the inventive material.

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

The invention is directed toward a material used as an underlayment for landscaping. To use the material in this manner a user first prepares a desired location in a landscape setting. The preparation may include scraping away topsoil, digging a hole in a ground, raking soil or infill into a desired shape or specific location, or any other preparation of the underlying soil and rocks. Next the user take a portion of the inventive material and prepares the material for use. The preparation of the material may include unrolling the material, unfolding the material, measuring the material, and cutting the material. After the user has prepared the inventive material, the user then places the material on the ground on the prepared location. The user then may secure the material to the prepared location with one or more landscaping pins, pushing the landscaping pins through the material and into the ground to hold the material in place. The user may then complete the landscaping project by any number of means, such as placing soil on top of the material, placing sod on top of the material, or placing rocks on top of the material. If the user places soil on top of the material the user may then seed the soil with grass seed if desired or plant any number of plants on top of the soil.

The nonwoven material is specially engineered product for use in landscaping applications. The nonwoven material is formed from a polymer, an elastomer, and selective additives. The nonwoven material may be formed from any combination of materials. However, in the preferred embodiment the nonwoven material is formed from polypropylene, elastomeric copolymer, a mesh grid, and selective UV and other additives. The combination of elastomeric copolymer and mesh grid, the resulting nonwoven material exhibits enhanced chemical and mechanical static and kinetic coefficients of friction. This increased coefficient of friction enhances the slip resistance of the product for safety. The elastomeric copolymer utilized enhances the chemical coefficient of friction of the material. The mesh grid enhances the mechanical coefficient of friction, or slip resistance, of the nonwoven material. The elastomeric copolymer utilized has a tacky chemical property which increases the chemical coefficient of friction.

The process of formation is similar to the process described in U.S. Pat. No. 6,740,609 (Peng et al.), the disclosure of which is hereby incorporated by reference. The process of forming the nonwoven material begins with blending a desired amount of polypropylene, elastomeric copolymer, and additives. The materials are then blended and heated to the point of melting. The melted blend of materials are then forced through a screw, barrel, and die. The melted material blend is then forced through a spinneret.

The melted blend of materials cools after passing through the spinneret to form filaments. The filaments are bound together in random orientations. The filaments are then stretched. In the preferred embodiment the bound filaments are stretched in the machine direction although the material may be stretched in any direction. The filaments are then passed through high speed flappers. The flappers orient the filaments in the proper orientation to increase the tensile and mechanical strength in the cross direction.

The filaments are then distributed and laid to form a first layer of nonwoven material. A layer of woven material is then deposited on top of the first layer of nonwoven material. Additional filaments are then deposited on top of the layer of woven material to form a second layer of nonwoven material. Multiple layers of woven and nonwoven material may be attached together.

The combined layers are then calendared between a seam roll and an embossing roll. The embossing roll may apply any pattern to the surface of the resulting material. The combined material may be calendared at any temperature. The rolls used in the calendaring process may be heated or cooled. The resulting material is then wound into a roll of finalized product.

The resulting nonwoven material may have any number of properties. The nonwoven material has specific physical properties in its preferred embodiments. In one embodiment the material has the following physical properties (with a variance of +/−10%):

Density of 0.9 grams per cubic centimeter as measured under ASTM D1505

Product weight of 55 grams per square meter as measured under ASTM D3776

Machine direction tensile strength of 41 pounds as measured under ASTM D5034

Cross direction tensile strength of 33 pounds as measured under ASTM D5034

Machine direction elongation of 65% as measured under ASTM D5034

Cross direction elongation of 75% as measured under ASTM D5034

Machine direction trapezoid tear of 14 pounds as measured under ASTM D4533

Cross direction trapezoid tear of 14 pounds as measured under ASTM D4533

Water permeability of 52 liters per square meter per second as measured under ASTM D4491

Permittivity of 1.04 per second as measured under ASTM D4491

In another embodiment of the invention the nonwoven material has the following physical properties (with a variance of +/−10%):

Density of 0.9 grams per cubic centimeter as measured under ASTM D1505

Product weight of 85 grams per square meter as measured under ASTM D3776

Machine direction tensile strength of 72 pounds as measured under ASTM D5034

Cross direction tensile strength of 51 pounds as measured under ASTM D5034

Machine direction elongation of 65% as measured under ASTM D5034

Cross direction elongation of 75% as measured under ASTM D5034

Machine direction trapezoid tear of 17 pounds as measured under ASTM D4533

Cross direction trapezoid tear of 22 pounds as measured under ASTM D4533

Water permeability of at least 40 liters per square meter per second as measured under ASTM D4491

Permittivity of 0.8 per second as measured under ASTM D4491

Referring to FIG. 1, the preferred embodiment of the material 100 is illustrated. The material 100 is formed in layers. A first layer of nonwoven polypropylene 102 is laid down. Then an inner layer of mesh 104 is applied. The inner layer of mesh 104 is any woven material. In the preferred embodiment, the mesh 104 utilized has a standard grid structure, formed as a series of squares. In other embodiments, the mesh may be formed of material in other shapes—such as triangles or hexagons. Then the top layer of nonwoven polypropylene 106 is applied.

Any type of nonwoven material may be applied to the material 100. In the preferred embodiment the nonwoven material has a specific recipe for formation. In the preferred embodiment the nonwoven material is formed from 85% polypropylene by weight, 10% polyethylene by weight, 3% ethylene methyl acrylate by weight, and 2% UV stabilization compound by weight. The UV stabilization compound is any compound configured to prolong the life of the resulting polymer material by blocking the absorption of UV rays. The UV stabilization compound may be selected from among known UV stabilization compounds such as rutile titanium dioxide, hydroxybenzophenone, hydroxyphenylbenzotriazole, carbon black, oxanilide, benzophenone, benzotriazole, hydroxyphenyltriazine, Hindered Amine Light Stabilizers (HALS), or a combination thereof.

Figure 2:
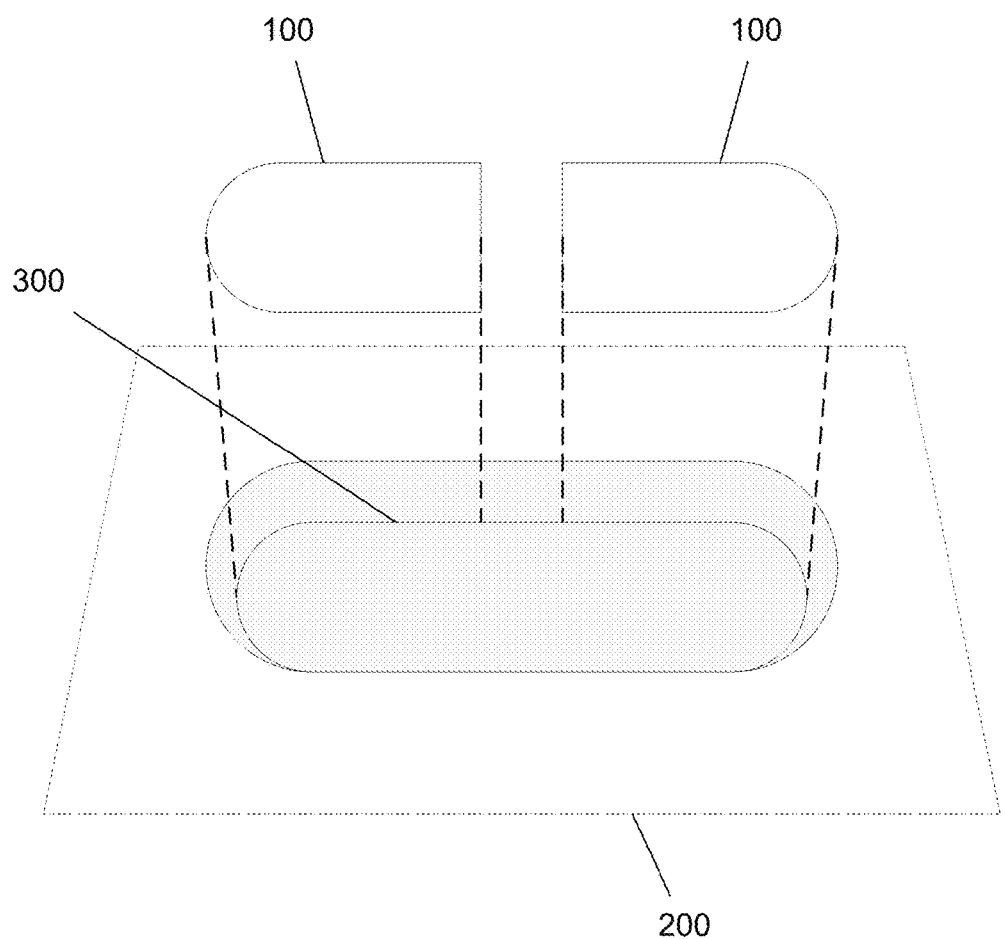
FIG. 2 is a perspective view of the material in use.

Referring to FIG. 2, the use of the material 100 is illustrated. A user uses the material on a selected portion of the ground 200. The material 100 can be used in any position on the ground 200. In the preferred embodiment the material 100 is utilized in a hole 300 in the ground. The user starts with digging a hole 300 in the ground 200. The user can create the hole 300 by any number of means, such as scraping away a section of topsoil, digging, removing a portion of soil, or raking away a portion of soil or infill. In some embodiments the hole 300 may be created by mechanical means or through the use of machinery.

After the user prepares the chosen portion of the ground 200 to place the material 100 on, the user then prepares the material 100 for use. The user may measure the hole 300 and then measure the material 100 to ensure that the chosen material 100 can fit within the hole 300. The user may then cut a portion of the material 100 to a desired shape to fit within the hole 300. The user may place one or more pieces of material 100 within the hole 300. In other embodiments the user may simply unroll the material 100 into the hole 300 or unfold a precut portion of the material 100 and place it within the hole 300.

Once in a desired location, the user can secure the material 100 through the use of landscaping pins or other items which can pass through the material 100 and hold the material 100 in place. The user may then place soil, rocks, sod, or any other natural element on top of the material 100, thus filing in the hole 300. In some embodiments the user may place a plant in the soil in top of the material 100. The user may also then seed and water the soil on top of the material 100. In other embodiments the user places one or more landscaping features on top of the material 100, such as bricks, pavers, statues, fountains, a water feature, or any other desired item.

The material 100 may be any size and shape when used by the user. In some embodiments the material 100 may be preshaped for use at the landscaping location. In this embodiment the material 100 may be heated and shaped over a mold such that it has a predetermined non-planar shape.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The invention claimed is:

1. A method for utilizing a nonwoven material comprising
   a) creating a layered nonwoven material, comprising the steps
      i) creating a material mixture; wherein creating comprises the steps of
         (1) adding eighty-five percent by weight of polypropylene;
         (2) adding ten percent by weight of polyethylene;
         (3) adding three percent by weight of ethylene methyl acrylate;
         (4) adding two percent by weight of a UV stabilizer;
      ii) melting said material mixture;
      iii) extruding said material mixture;
      iv) creating a first layer of nonwoven material formed from said material mixture after said material mixture is heated and extruded;
      v) placing a layer of woven mesh on top of said first layer;
      vi) depositing a second layer of nonwoven material formed from said material mixture, after said material mixture is heated and extruded, on top of said layer of woven mesh such that said layer of woven mesh is disposed between said first layer of nonwoven material and said second layer of nonwoven material;
   b) calendaring said layered nonwoven material;
   c) identifying a landscaping location for receiving a portion of said layered nonwoven material;
   d) preparing said landscaping location after identifying said landscaping location; and
   e) placing a portion of said layered nonwoven material on said landscaping location.

2. The method as in claim 1 further comprising
   a) measuring a portion of said landscaping location; and
   b) measuring a portion of said layered nonwoven material.

3. The method as in claim 1 further comprising cutting one or more desired shapes from a portion of said layered nonwoven material.

4. The method as in claim 1 further comprising securing a portion of said layered nonwoven material to said landscaping location by pushing one or more landscaping pins through said layered nonwoven material and into a portion of ground underneath said layered nonwoven material.

5. The method as in claim 1 further comprising placing a portion of soil, a portion of sod, or one or more rocks on top of said layered nonwoven material.

6. The method as in claim 1 wherein said step of preparing said landscape location is selected from a group consisting of: scraping a section of topsoil, digging a hole in a portion of ground, removing a portion of soil from said landscaping location, and raking a portion of soil or infill.

7. The method as in claim 1 further comprising
   a) placing a portion of soil on top of said layered nonwoven material;
   b) placing one or more seeds into said portion of soil disposed on top of said layered nonwoven material; and
   c) watering said portion of soil disposed on top of said layered nonwoven material.

8. The method as in claim 1 further comprising
   a) heating a portion of said layered nonwoven material;
   b) stretching a portion of said layered nonwoven material over a mold.

9. The method as in claim 1 further comprising placing an embossing pattern on a top surface of said layered nonwoven material with an embossing roll.

10. The method as in claim 1 further comprising
a) testing a plurality of physical properties of a portion of said layered nonwoven material;
b) verifying that each of said plurality of physical properties are within a variance of ten percent of a set of values
   i) wherein said set of values comprise
      (1) a density of 0.9 grams per cubic centimeter;
      (2) a product weight of 55 grams per square meter;
      (3) a machine direction tensile strength of 41 pounds;
      (4) a cross direction tensile strength of 33 pounds;
      (5) a machine direction elongation of 65%;
      (6) a cross direction elongation of 75%;
      (7) a machine direction trapezoid tear of 14 pounds;
      (8) a cross direction trapezoid tear of 14 pounds;
      (9) a water permeability of 52 liters per square meter per second; and
      (10) a permittivity of 1.04 per second.

11. The method as in claim 1 further comprising
a) testing a plurality of physical properties of a portion of said layered nonwoven material;
b) verifying that each of said plurality of physical properties are within a variance of ten percent of a set of values
   i) wherein said set of values comprise
      (1) a density of 0.9 grams per cubic centimeter;
      (2) a product weight of 85 grams per square meter;
      (3) a machine direction tensile strength of 72 pounds;
      (4) a cross direction tensile strength of 51 pounds;
      (5) a machine direction elongation of 65%;
      (6) a cross direction elongation of 75%;
      (7) a machine direction trapezoid tear of 17 pounds;
      (8) a cross direction trapezoid tear of 22 pounds;
      (9) a water permeability of at least 40 liters per square meter per second; and
      (10) a permittivity of 0.8 per second.

12. The method as in claim 10 further comprising
a) measuring a portion of said landscaping location;
b) measuring a portion of said layered nonwoven material;
c) cutting one or more desired shapes from a portion of said layered nonwoven material;
d) securing a portion of said layered nonwoven material to said landscaping location by pushing one or more landscaping pins through said layered nonwoven material and into a portion of ground underneath said layered nonwoven material; and
e) placing a portion of soil, a portion of sod, or one or more rocks on top of said layered nonwoven material.

13. The method as in claim 12 wherein a step of preparing a landscape location is selected from a group consisting of: scraping a section of topsoil, digging a hole in a portion of ground, removing a portion of soil from a landscaping location, and raking a portion of soil or infill.

14. The method as in claim 13 further comprising placing an embossing pattern on a top surface of said layered nonwoven material with an embossing roll.

15. The method as in claim 14 further comprising
a) heating a portion of said layered nonwoven material; and
b) stretching a portion of said layered nonwoven material over a mold.

16. The method as in claim 11 further comprising
a) measuring a portion of said landscaping location;
b) measuring a portion of said layered nonwoven material;
c) cutting one or more desired shapes from a portion of said layered nonwoven material;
d) securing a portion of said layered nonwoven material to said landscaping location by pushing one or more landscaping pins through said layered nonwoven material and into a portion of ground underneath said layered nonwoven material; and
e) placing a portion of soil, a portion of sod, or one or more rocks on top of said layered nonwoven material.

17. The method as in claim 16 wherein a step of preparing a landscape location is selected from a group consisting of: scraping a section of topsoil, digging a hole in a portion of ground, removing a portion of soil from a landscaping location, and raking a portion of soil or infill.

18. The method as in claim 17 further comprising placing an embossing pattern on a top surface of said layered nonwoven material with an embossing roll.

19. The method as in claim 18 further comprising
a) heating a portion of said layered nonwoven material; and
b) stretching a portion of said layered nonwoven material over a mold.

* * * * *